United States Patent
Sasaki

(10) Patent No.: US 12,366,375 B2
(45) Date of Patent: Jul. 22, 2025

(54) VEHICLE AIR CONDITIONING DEVICE AND VEHICLE AIR CONDITIONING METHOD

(71) Applicant: TOYOTA JIDOSHA KABUSHIKI KAISHA, Toyota (JP)

(72) Inventor: Hirotaka Sasaki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 173 days.

(21) Appl. No.: 18/454,950

(22) Filed: Aug. 24, 2023

(65) Prior Publication Data
US 2024/0151420 A1    May 9, 2024

(30) Foreign Application Priority Data
Nov. 7, 2022   (JP) .................... 2022-178122

(51) Int. Cl.
   *F24F 11/63* (2018.01)
(52) U.S. Cl.
   CPC .................... *F24F 11/63* (2018.01)

(58) Field of Classification Search
CPC . F24F 11/63; B60H 1/00064; B60H 1/00885; B60H 1/3211
See application file for complete search history.

(56) References Cited

U.S. PATENT DOCUMENTS

2015/0114016 A1* 4/2015 Ota .................... B60H 1/00742
                                                       62/133
2022/0011006 A1    1/2022 Miura et al.

FOREIGN PATENT DOCUMENTS

WO    2020/203151 A1    10/2020

* cited by examiner

Primary Examiner — Lionel Nouketcha
(74) Attorney, Agent, or Firm — Oliff PLC

(57) ABSTRACT

A vehicle air conditioning device includes a temperature adjustment unit configured to adjust a temperature of air taken in and a control unit configured to control the temperature adjustment unit. The control unit is configured to acquire a medium reference temperature of the temperature adjustment unit, set a difference between the medium reference temperature and a correction value as a set temperature of the temperature adjustment unit and increase the correction value as the temperature of air taken in increases, and decrease the correction value as the temperature of air taken in decreases.

5 Claims, 6 Drawing Sheets

VEHICLE AIR CONDITIONING DEVICE AND VEHICLE AIR CONDITIONING METHOD

CROSS-REFERENCE TO RELATED APPLICATION

This application claims priority to Japanese Patent Application No. 2022-178122 filed on Nov. 7, 2022 incorporated herein by reference in its entirety.

BACKGROUND

1. Technical Field

The present disclosure relates to a vehicle air conditioning device and a vehicle air conditioning method.

2. Description of Related Art

WO 2020/203151 discloses an air conditioning device including a heat pump cycle, a heating unit, a low temperature-side heat medium circuit, and a heat radiation amount adjustment control unit. In WO 2020/203151, the heat radiation amount adjustment control unit adjusts the heat radiation amount so that the temperature of the blown air heated by a heating heat exchanger approaches the target temperature.

SUMMARY

However, in a structure that adjusts the temperature by radiating heat after heating, when the temperature of the air taken in is high, extra energy is consumed to heat the air. Conversely, when the amount of heating is reduced in order to reduce energy consumption (power consumption), the air cannot be heated to the temperature set by the occupant, and comfort may be impaired.

The present disclosure provides a vehicle air conditioning device and a vehicle air conditioning method capable of reducing power consumption while maintaining comfort.

One aspect of the present disclosure provides a vehicle air conditioning device. The vehicle air conditioning device includes a temperature adjustment unit configured to adjust a temperature of air taken in and a control unit configured to control the temperature adjustment unit. The control unit is configured to acquire a medium reference temperature of the temperature adjustment unit, set a difference between the medium reference temperature and a correction value as a set temperature of the temperature adjustment unit and increase the correction value as a temperature of air taken in increases, and decrease the correction value as a temperature of air taken in decreases.

In the vehicle air conditioning device according to the above aspect, the temperature adjustment unit is configured to be controlled by the control unit, and the temperature adjustment unit adjusts the temperature of the air taken in. Therefore, the temperature-adjusted air can be blown into a vehicle cabin. Here, the control unit acquires the medium reference temperature of the temperature adjustment unit. Further, the control unit sets the difference between the medium reference temperature and the correction value as the set temperature of the temperature adjustment unit. Furthermore, the control unit increases the correction value as the temperature of the air taken in increases. As a result, in situations where the temperature of the medium does not need to be set high, such as when the temperature of the air taken in is higher than the outside air temperature, the medium set temperature of the temperature adjustment unit need not rise unnecessarily, and power consumption can be reduced.

In addition, the control unit raises the set temperature as the temperature of the air taken in becomes lower. As a result, the air can be heated to a comfortable temperature for the occupant even in a state where the low-temperature air is taken in, such as when the inside air circulation mode was switched to the outside air introduction mode.

In the vehicle air conditioning device according to the above aspect, the correction value may be configured to be calculated based on a difference between a temperature of air taken in and an outside air temperature.

In the vehicle air conditioning device according to the above aspect, by correcting the set temperature of the temperature adjustment unit based on the difference between the temperature of the air taken in and the outside air temperature, the air can be heated without consuming extra energy, especially when the outside air is introduced.

In the vehicle air conditioning device according to the above aspect, the control unit may be configured to estimate a temperature of air taken in based on a temperature of an evaporator that the air taken in passes through.

In the vehicle air conditioning device according to the above aspect, the air taken in passes through the evaporator. Therefore, when the temperature of the air taken in is estimated based on the temperature of the evaporator, the need to provide a dedicated thermistor or the like is eliminated.

In the vehicle air conditioning device according to the above aspect, the control unit may be configured to estimate a temperature of air taken in based on a temperature of air in a vehicle cabin, an outside air temperature, and a ratio between air in the vehicle cabin and an outside air, in the air taken in.

Particularly, in the vehicle air conditioning device according to the above aspect, even when the air passing through the evaporator in the outside air introduction mode has a temperature distribution, the temperature of the air taken in can be accurately estimated.

Another aspect of the present disclosure provides a vehicle air conditioning method. The vehicle air conditioning method is a method for performing air conditioning by controlling a temperature adjustment unit that adjusts a temperature of air taken in. The vehicle air conditioning method includes acquiring a medium reference temperature of the temperature adjustment unit, and setting a difference between the medium reference temperature and a correction value as a set temperature of the temperature adjustment unit, and increasing the correction value as the temperature of air taken in increases.

As described above, by the vehicle air conditioning device and the vehicle air conditioning method according to the present disclosure, it is possible to reduce power consumption while maintaining comfort.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
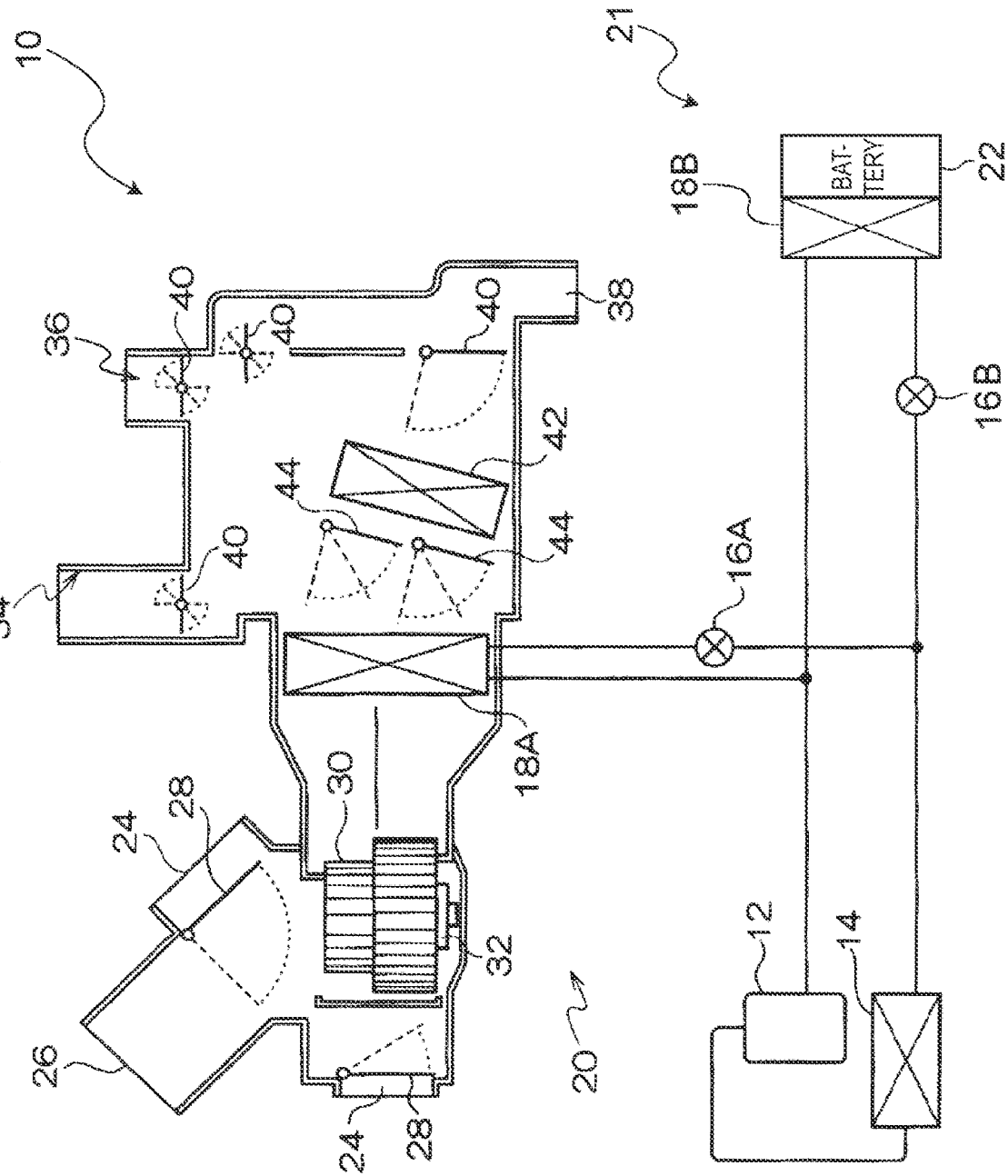
FIG. 1 is a schematic diagram showing an overall configuration of a vehicle air conditioning device according to an embodiment.

A vehicle air conditioning device 10 according to an embodiment will be described with reference to the drawings. As shown in FIG. 1, the vehicle air conditioning device 10 is mounted on an electrified vehicle, and includes a compressor 12, a condenser 14, expansion valves 16A and 16B, and evaporators 18A and 18B. These components are connected via piping to provide a refrigerating cycle. Although the vehicle air conditioning device 10 of the present embodiment will be described as a vehicle air conditioning device mounted on a battery electric vehicle (BEV) that is an example of the electrified vehicle, the vehicle air conditioning device 10 may be mounted on a hybrid electric vehicle (HEV) including an engine (internal combustion engine).

In the vehicle air conditioning device 10, a refrigerant is compressed by rotational driving of the compressor 12. The compressed refrigerant is liquefied by passing through the condenser 14, atomized by the expansion valve 16A, and sent to the evaporator 18A. Similarly, the refrigerant liquefied by passing through the condenser 14 is atomized by the expansion valve 16B and sent to the evaporator 18B.

The vehicle air conditioning device 10 also includes an air conditioning unit serving as a temperature adjustment unit that is provided in an instrument panel (not shown) to adjust the temperature of the air taken in, and a battery cooling unit 21 that cools a battery 22 of the electrified vehicle.

The battery cooling unit 21 cools the battery 22 with the evaporator 18B by opening the expansion valve 16B when the temperature of the battery 22 detected by a battery temperature sensor (not shown) is equal to or higher than a predetermined value. Cooling of the battery 22 by the evaporator 18B may be an air cooling system or a liquid cooling system.

The air conditioning unit 20 is provided with an inside air introduction port 24 that opens toward the inside of the vehicle cabin and an outside air introduction port 26 that opens toward the outside of the vehicle as air introduction ports. An opening and closing door 28 for selectively opening and closing the inside air introduction port 24 and the outside air introduction port 26, and a blower fan 30 that is an air blowing means are provided in the air conditioning unit 20.

The vehicle air conditioning device 10 can set an inside air circulation mode for introducing the air in the vehicle cabin or an outside air introduction mode for introducing the air outside the vehicle, as an introduction mode for the air used to generate the conditioned air. The opening and closing door 28 is operated in accordance with the set air introduction mode. Further, the inside air or the outside air is sent to the evaporator 18 due to rotational driving of the blower fan 30 by a blower motor 32.

The vehicle air conditioning device 10 is also provided with a defroster outlet 34, a register outlet 36, and a foot outlet 38. The defroster outlet 34 is opened toward the front windshield glass, for example. The register outlet 36 is opened toward the occupant in the vehicle cabin, for example. The foot outlet 38 is opened toward the feet of the occupant, for example. The inside of the air conditioning unit 20 and the inside of the vehicle cabin are communicated through the defroster outlet 34, the register outlet 36, and the foot outlet 38.

The air conditioning unit 20 is provided with a mode switching door 40 for selectively opening and closing the defroster outlet 34, the register outlet 36, and the foot outlet 38.

Here, the air conditioning unit 20 includes a heater core 42 and an air mix door 44. The heater core 42 is arranged on the downstream side of the conditioned air from the evaporator 18A and heats the air passing through the heater core 42. When the electrified vehicle is a BEV, the heater core 42 is heated by heating the coolant flowing through the heater core 42 with an electric heater or the like. Further, when the electrified vehicle is an HEV or the like including an engine, the heater core 42 may be heated by circulating the coolant between the engine and the heater core 42 to exchange the heat.

The air mix door 44 divides the air that has passed through the evaporator 18A into the air that passes through the heater core 42 and the air that bypasses the heater core 42. Specifically, in the air conditioning unit 20, when the opening degree of the air mix door 44 is controlled in accordance with the set air conditioning temperature, the air that has passed through the heater core 42 and the air that has bypassed the heater core 42 are mixed and the conditioned air is generated.

Hardware Configuration of Vehicle Air Conditioning Device 10

Figure 2:
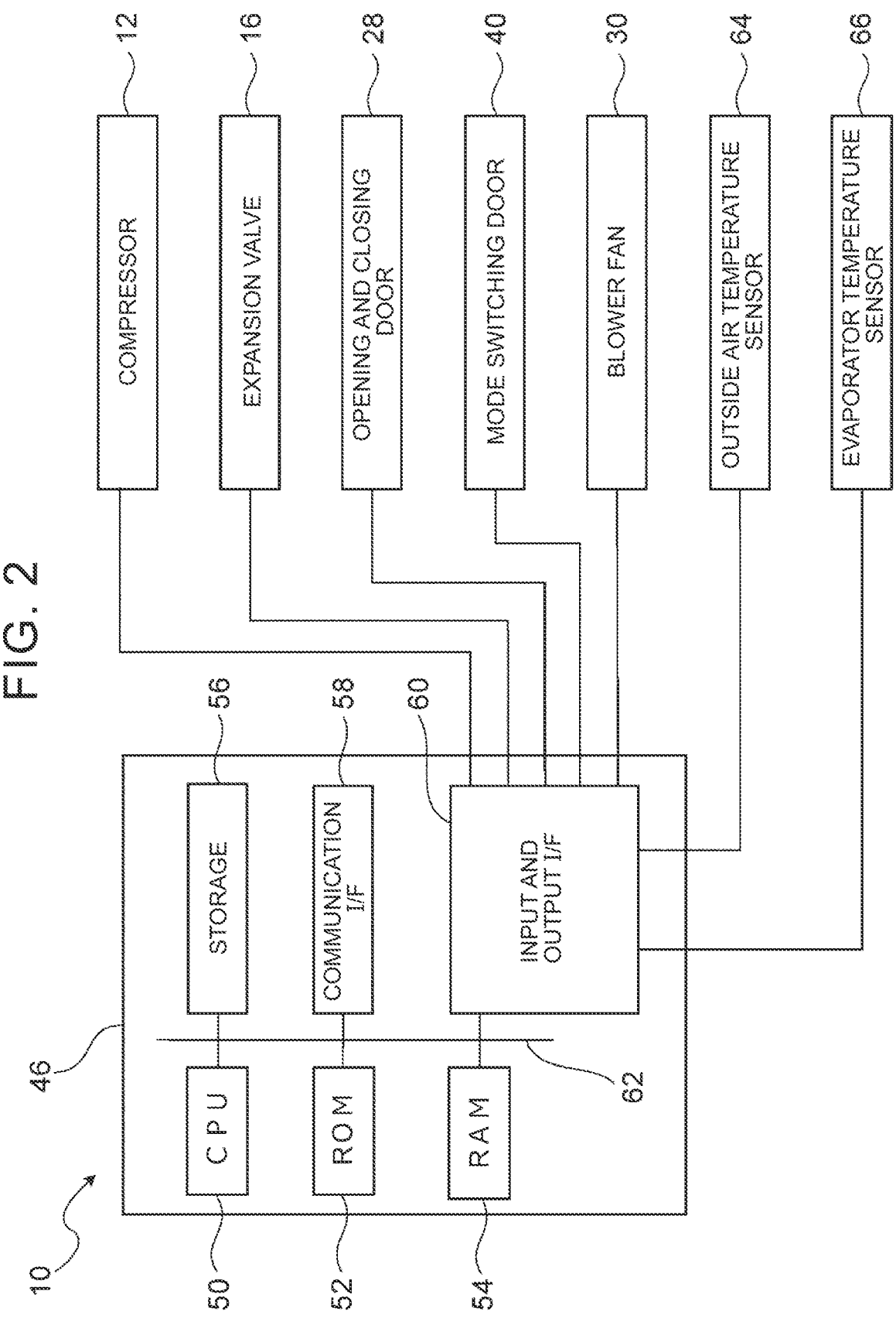
FIG. 2 is a block diagram showing a hardware configuration of the vehicle air conditioning device according to the embodiment.

FIG. 2 is a block diagram showing a hardware configuration of the vehicle air conditioning device 10. As shown in FIG. 2, the vehicle air conditioning device 10 includes an air conditioning electronic control unit (ECU) 46 serving as a control unit that controls the air conditioning unit 20.

The air conditioning ECU 46 includes a central processing unit (CPU: processor) 50, a read-only memory (ROM) 52, a random access memory (RAM) 54, a storage 56, a communication interface (UF) 58, and an input and output OF 60. The components above are connected via a bus 62 so as to be able to communicate with each other.

The CPU 50 is a central arithmetic processing unit that executes various programs and controls each unit. That is, the CPU 50 reads the program from the ROM 52 or the storage 56, and executes the program using the RAM 54 as a work area. The CPU 50 controls each of the above components and performs various arithmetic processes in accordance with the programs recorded in the ROM 52 or the storage 56.

The ROM 52 stores various programs and various data. The RAM 54 temporarily stores a program or data as a work area. The storage 56 is composed of a hard disk drive (HDD) or a solid state drive (SSD), and stores various programs including an operating system, and various data. In the present embodiment, the ROM 52 or the storage 56 stores an air conditioning program for performing air conditioning and various data, etc.

The communication OF 58 is an interface for the air conditioning ECU 46 to communicate with other devices, and standards such as a controller area network (CAN), Ethernet (registered trademark), long term evolution (LTE), fiber distributed data interface (FDDI), and Wi-Fi (registered trademark) are used.

The input and output OF 60 is electrically connected to peripheral devices, and the input and output OF 60 of the present embodiment is electrically connected to, as an example, the compressor 12, the expansion valves 16, the opening and closing door 28, the mode switching door 40, the blower fan 30, an outside air temperature sensor 64, and an evaporator temperature sensor 66.

The compressor 12 is rotationally driven by the driving force of an engine or a motor, and the cooling capacity is controlled by controlling the refrigerant discharge pressure of the compressor 12. The expansion valves 16 include the expansion valve 16A on the air conditioning unit 20 side and the expansion valve 16B on the battery cooling unit 21 side.

The opening and closing door 28 switches between the inside air circulation mode and the outside air introduction mode by opening and closing in accordance with the set air introduction mode. Further, the opening and closing door 28 may be controlled to introduce both the air in the vehicle cabin and the air outside the vehicle. Note that the air conditioning ECU 46 actually controls an actuator that opens and closes the opening and closing door 28.

The mode switching door 40 is opened and closed in accordance with the set mode. Accordingly, a mode of blowing out the conditioned air from the defroster outlet 34, a mode of blowing out the conditioned air from the register outlet 36, a mode of blowing out the conditioned air from the foot outlet 38, etc. can be set. Note that the air conditioning ECU 46 actually controls an actuator that opens and closes the mode switching door 40.

The outside air temperature sensor 64 detects the temperature outside the vehicle and transmits it to the air conditioning ECU 46. The evaporator temperature sensor 66 is provided in the evaporator 18A, detects the temperature of the evaporator 18A, and transmits it to the air conditioning ECU 46.

Functional Configuration of Vehicle Air Conditioning Device 10

The vehicle air conditioning device 10 realizes various functions using hardware resources shown in FIG. 2. The functional configuration realized by the vehicle air conditioning device 10 will be described with reference to FIG. 3.

Figure 3:
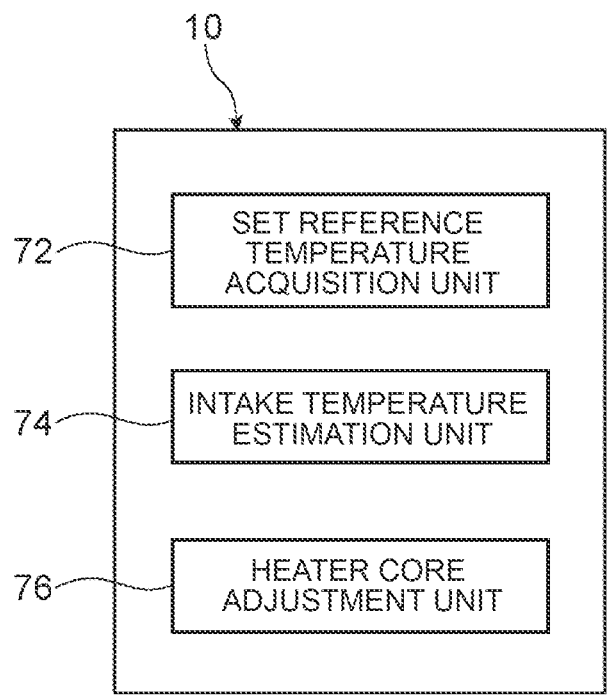
FIG. 3 is a block diagram showing a hardware configuration of the vehicle air conditioning device according to the embodiment.

As shown in FIG. 3, the vehicle air conditioning device 10 includes a set reference temperature acquisition unit 72, an intake temperature estimation unit 74, and a heater core adjustment unit 76, as functional configurations. Each functional configuration is realized by the CPU 50 as the CPU 50 reads and executes the program stored in the ROM 52 or the storage 56.

The set reference temperature acquisition unit 72 acquires the set reference temperature of the air conditioning unit 20. Specifically, the set reference temperature acquisition unit 72 calculates the target blowout temperature TAO based on the air conditioning temperature set by the occupant, and also acquires the medium reference temperature TWO_base calculated from the target blowout temperature TAO, as the set reference temperature of the air conditioning unit 20. Here, the relationship between the target blowout temperature TAO and the medium reference temperature TWO_base will be illustrated with reference to the graph of FIG. 4.

Figure 4:
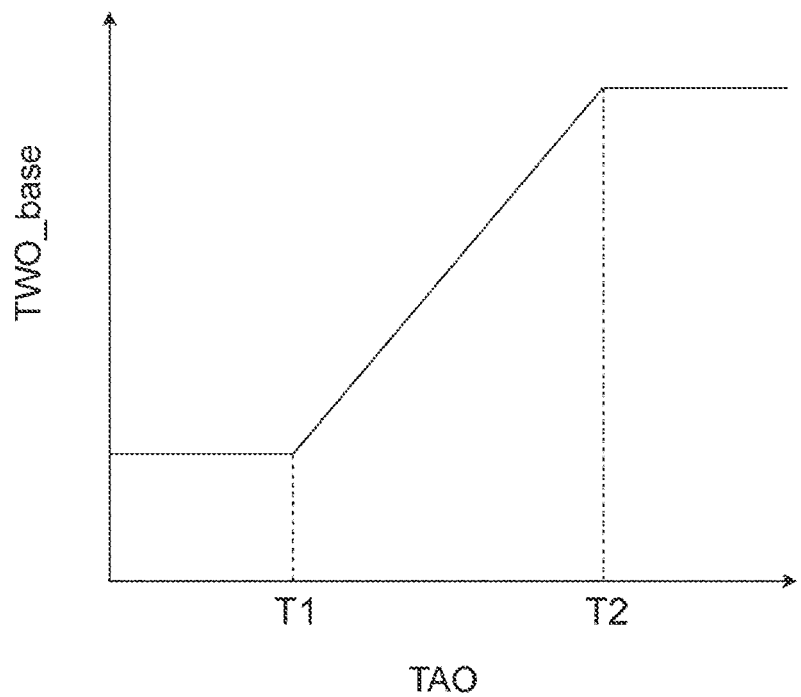
FIG. 4 is a graph showing the relationship between a target blowout temperature and a medium reference temperature.

The horizontal axis of FIG. 4 represents the target blowout temperature TAO, and the vertical axis represents the medium reference temperature TWO_base. The target blowout temperature TAO is calculated based on the air conditioning temperature set by the occupant, as described above.

As shown in the graph of FIG. 4, the medium reference temperature TWO_base is constant in an area that the target blowout temperature TAO is equal to or lower than a threshold value T1. This corresponds, for example, to the lower limit of the set temperature of the medium. Further, the medium reference temperature TWO_base is constant in an area that the target blowout temperature TAO is equal to or higher than a threshold value T2. This corresponds, for example, to the upper limit of the set temperature of the medium.

In an area that the target blowout temperature TAO is between the threshold value T1 and the threshold value T2, the medium reference temperature TWO_base is set such that the medium reference temperature TWO_base increases as the target blowout temperature TAO increases. In the present embodiment, as an example, the coolant flowing inside the heater core 42 serves as the superheating medium. Therefore, the medium reference temperature TWO_base serves as the reference coolant temperature of the coolant.

The intake temperature estimation unit 74 shown in FIG. 3 estimates the temperature of the air taken into the heater core 42 (intake temperature). In other words, the intake temperature estimation unit 74 estimates the temperature of the air that has passed through the evaporator 18A. In the present embodiment, the intake temperature estimation unit 74 estimates the intake temperature by at least one of two methods, as an example. The two methods are described below.

Figure 5:
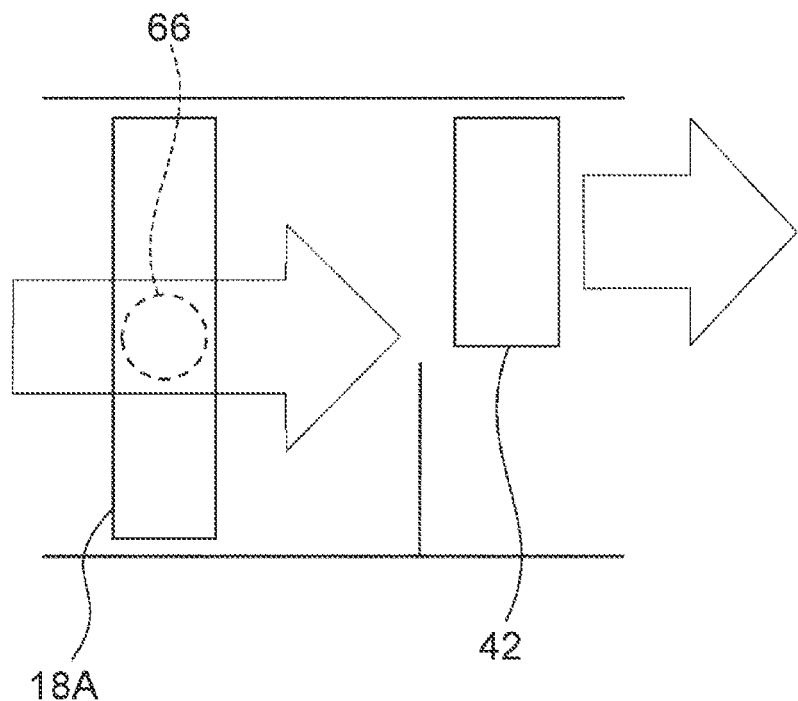
FIG. 5 is a schematic diagram for illustrating an example of a method for estimating an intake temperature.

FIG. 5 is a schematic diagram for illustrating an example of a method for estimating the intake temperature by the intake temperature estimation unit 74. In the method shown in FIG. 5, the intake temperature is estimated using the evaporator temperature sensor 66 provided in the evaporator 18A.

Specifically, since the air taken in passes through the evaporator 18A, the intake temperature of the air taken in is estimated based on the temperature of the evaporator 18A. That is, since the heat is exchanged between the air and the evaporator 18A due to passing of the air through the evaporator 18A, the temperature of the evaporator 18A detected by the evaporator temperature sensor 66 is estimated as the temperature of the air taken into the heater core 42.

Figure 6:
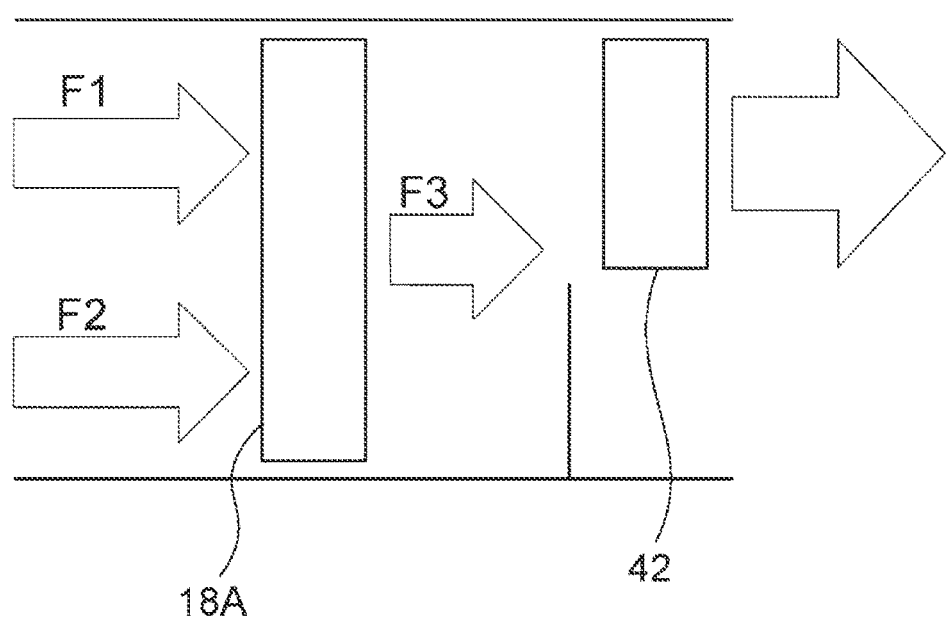
FIG. 6 is a schematic diagram for illustrating another example of a method for estimating the intake temperature.

FIG. 6 is a schematic diagram for illustrating another example of a method for estimating the intake temperature by the intake temperature estimation unit 74. In the method shown in FIG. 6, the temperature of the air taken into the heater core 42 by another method is estimated without using the evaporator temperature sensor 66. In particular, in the method of FIG. 6, the intake temperature can be estimated with high accuracy in a state in which both the air in the vehicle cabin and the air outside the vehicle are introduced by the opening and closing door 28.

Specifically, in the method shown in FIG. 6, the ratio between the air F1 of the outside air and the air F2 of the inside air is estimated, in a state in which the air F1 introduced from the outside air introduction port 26 (see FIG. 1) and the air F2 introduced from the inside air introduction port 24 (see FIG. 1) are passing through the evaporator 18A. For example, the ratio of the air F1 can be estimated from the opening degree of the opening and closing door 28, the traveling state of the vehicle, etc.

Further, the outside air temperature acquired from the outside air temperature sensor 64 is assumed to be the same temperature as that of the air F1, the temperature in the vehicle cabin is assumed to be the same temperature as that of the air F2, and the temperature of the air F3 that is a mixture of the air F1 and the air F2 is calculated. When the ratio of the air F1 is X(%), the temperature of the air F1 is the outside air temperature TAM, and the temperature of the air F2 is TR, the temperature $T_M$ of the air F3 is calculated by TM=TAM×X+TR×(100−X).

The intake temperature estimation unit 74 may estimate the calculated temperature $T_M$ of the air F3 as the temperature of the air taken into the heater core 42.

The heater core adjustment unit 76 shown in FIG. 3 controls the temperature of the heater core 42 based on the temperature of the air estimated by the intake temperature estimation unit 74. Specifically, the heater core adjustment unit 76 sets the difference between the medium reference temperature TWO_base and the correction value as the set temperature of the heater core 42 (temperature adjustment unit) and performs the control of increasing the correction value as the temperature of the air taken in increases. The temperature setting method for the heater core 42 will be described with reference to FIG. 7.

Figure 7:
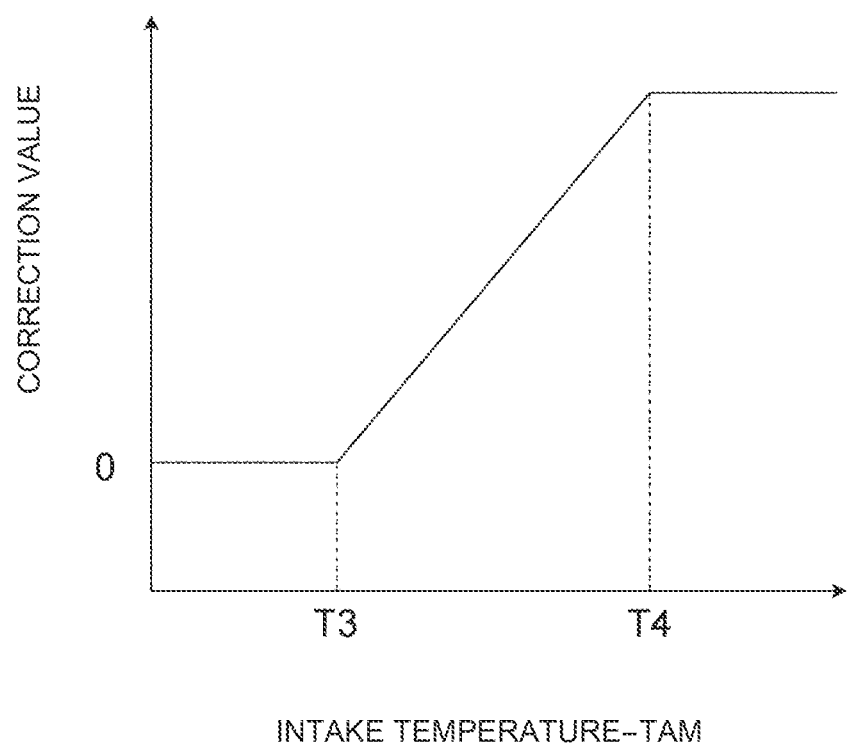
FIG. 7 is a graph showing the relationship between the intake temperature and an outside air temperature, and a correction value.

FIG. 7 is a graph showing the relationship between the intake temperature and the outside air temperature TAM, and the correction value. The horizontal axis of FIG. 7 represents the difference between the temperature of the air taken into the heater core 42 (intake temperature) that is estimated by the intake temperature estimation unit 74 and the outside air temperature TAM. The vertical axis of FIG. 7 represents the correction value of the set temperature of the heater core 42.

As shown in the graph of FIG. 7, the correction value is zero and is constant in an area that the difference between the intake temperature and the outside air temperature TAM is equal to or lower than a threshold value T3. This suppresses the correction value from becoming negative. Further, the correction value is constant in an area that the difference between the intake temperature and the outside air temperature TAM is equal to or higher than a threshold value T4. This suppresses the correction value from becoming excessively large.

In a region that the difference between the intake temperature and the outside air temperature TAM is between the threshold value T3 and the threshold value T4, the correction value increases as the difference between the intake temperature and the outside air temperature TAM increases. In other words, the correction value is set to increase as the difference between the intake temperature and the outside air temperature TAM increases. The heater core adjustment unit 76 calculates the medium set temperature TWO by the following equation using the correction value in FIG. 7 and the medium reference temperature TWO_base acquired by the set reference temperature acquisition unit 72.
Equation 1

$$TWO = TWO\_base - correction\ value \quad (1)$$

When the difference between the medium reference temperature TWO_base and the correction value is smaller than a predetermined lower limit value a, the heater core adjustment unit 76 sets the lower limit value a to the medium set temperature TWO, so that the medium set temperature TWO is suppressed from becoming an abnormal value.

According to the above equation, when the difference between the intake temperature and the outside air temperature TAM is large, determination can be made that the intake temperature is high due to the inside air circulation or the like. Therefore, the heater core adjustment unit 76 sets the medium set temperature TWO to be lower than the medium reference temperature TWO_base.

Operations

Next, operations of the present embodiment will be described.

Air Conditioning Process

Figure 8:
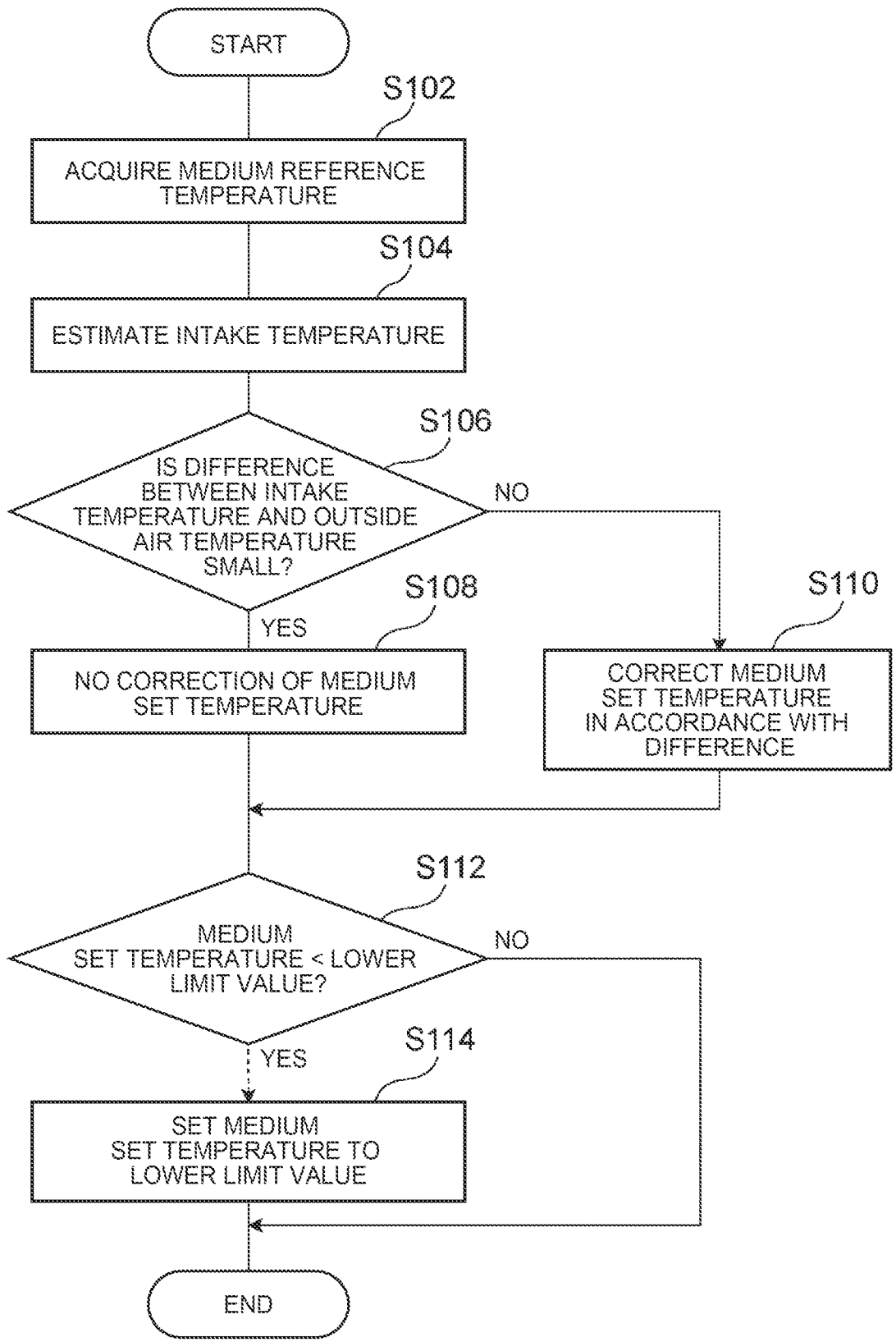
FIG. 8 is a flowchart showing an example of a flow of an air conditioning process in the embodiment.

An example of the flow of the air conditioning process by the vehicle air conditioning device 10 will be described with reference to the flowchart shown in FIG. 8. The present process is realized by the CPU 50 as the CPU 50 reads and executes the program stored in the ROM 52 or the storage 56.

The CPU 50 acquires the medium reference temperature TWO_base in step S102. Specifically, the CPU 50 calculates, by the function of the set reference temperature acquisition unit 72, the target blowout temperature TAO based on the air conditioning temperature set by the occupant, and acquires the medium reference temperature TWO_base calculated from the target blowout temperature TAO as the set reference temperature of the air conditioning unit 20.

The CPU 50 estimates the intake temperature, that is, the temperature of the air taken into the heater core 42 in step S104. Specifically, the CPU 50 estimates the temperature of the air that has passed through the evaporator 18A by the function of the intake temperature estimation unit 74. As for the method of estimating the intake temperature, one of the method shown in FIG. 5 and the method shown in FIG. 6 may be used to estimate the intake temperature, and both of the methods may be used to estimate the intake temperature, in accordance with the vehicle state, air conditioning mode, etc.

The CPU 50 determines whether the difference between the intake temperature and the outside air temperature is small in step S106. Specifically, when the difference between the intake temperature and the outside air temperature TAM in the graph of FIG. 7 is equal to or less than the threshold value T3, the CPU 50 determines that the difference is small, and proceeds to the process of step S108.

The CPU 50 proceeds to step S112 that is the next process, without correcting the medium set temperature TWO in step S108.

On the other hand, in the graph of FIG. 7, when the difference between the intake temperature and the outside air temperature TAM is larger than the threshold value T3, the CPU 50 proceeds to the process of step S110. The CPU 50 corrects the medium set temperature TWO in accordance with the difference in step S110. Specifically, according to the above equation, the difference between TWO_base and the correction value is set as the medium set temperature TWO.

The CPU 50 determines whether the medium set temperature TWO is lower than the lower limit value in step S112. When the medium set temperature TWO is lower than the lower limit value, the CPU 50 proceeds to the process of step S114, sets the medium set temperature TWO to the lower limit value, and ends the air conditioning process.

On the other hand, when the medium set temperature TWO is equal to or higher than the lower limit value, the CPU 50 does not perform the process of step S114, and ends the air conditioning process with the medium set temperature TWO set in step S108 or step S110.

As described above, in the vehicle air conditioning device 10 according to the present embodiment, the air conditioning unit 20 that is the temperature adjustment unit is configured to be controlled by the air conditioning ECU 46, and the temperature of the air taken in is adjusted by the air conditioning unit 20 (particularly, the heater core 42) so that the temperature-adjusted air can be blown into the vehicle cabin.

Here, the air conditioning ECU 46 acquires the medium reference temperature TWO_base of the heater core 42. Further, the air conditioning ECU 46 sets the difference between the medium reference temperature TWO_base and the correction value as the medium set temperature TWO of the temperature adjustment unit. Here, the air conditioning ECU 46 increases the correction value as the temperature of the air taken in increases. As a result, in a situation where the temperature of the medium does not need to be set high, such as when the temperature of the air taken in is higher than the outside air temperature, the medium set temperature TWO of the temperature adjustment unit need not rise unnecessarily, and power consumption can be reduced.

In addition, the air conditioning ECU 46 raises the set temperature as the temperature of the air taken in becomes lower. As a result, the air can be heated to a comfortable temperature for the occupant even in a state where the low-temperature air is taken in, such as when the inside air circulation mode was switched to the outside air introduction mode.

Further, in the present embodiment, by correcting the medium set temperature TWO of the heater core 42 based on the difference between the temperature of the air taken in and the outside air temperature TAM, the air can be heated without consuming extra energy, especially when the outside air is introduced.

Furthermore, in the present embodiment, the air taken in passes through the evaporator 18A, so when the temperature of the air taken in is estimated based on the temperature of the evaporator 18A, the intake temperature can be estimated using only the evaporator temperature sensor 66. This eliminates the need to provide a dedicated thermistor or the like.

Moreover, in the present embodiment, when estimating the intake temperature based on the ratio between the air in the vehicle cabin and the outside air, the temperature of the air taken in can be accurately estimated even when the air passing through the evaporator 18A in the outside air introduction mode has a temperature distribution.

Although the vehicle air conditioning device 10 according to the embodiment has been described above, the present disclosure can be implemented in various modes without departing from the scope of the present disclosure. For example, in the above-described embodiment, the overall configuration of the vehicle air conditioning device 10 has been described with reference to FIG. 1, but the configuration is not limited to this, and an air conditioning device adopting another configuration may be applied. For example, the heater core 42 may be replaced with another heating means.

Various processors other than the CPU 50 may execute the process executed by the CPU 50 by reading the program in the above-described embodiment. Examples of the processors in this case include a programmable logic device (PLD) such as a field-programmable gate array (FPGA) for which a circuit configuration can be changed after production, a dedicated electric circuit that is a processor having a circuit configuration designed exclusively for executing a specific process, such as an application specific integrated circuit (ASIC), and the like. The process may be executed by one of these various processors, or may be executed by a combination of two or more processors of the same kind or different kinds. For example, the process may be executed by a plurality of FPGAs, a combination of the CPU and the FPGA, and the like. Further, the hardware configuration of the various processors is, more specifically, an electric circuit in which circuit elements such as semiconductor devices are combined.

In the above-described embodiment, the storage 56 is configured to store various data. However, the present disclosure is not limited to this. For example, a non-transitory recording medium such as a compact disc (CD), a digital versatile disc (DVD), and a universal serial bus (USB) memory may be set as a storage unit. In this case, various programs, data, and the like are stored in the recording medium mentioned above.

What is claimed is:

1. A vehicle air conditioning device comprising:
   a temperature adjustment unit configured to adjust a temperature of air taken in; and
   a control unit configured to control the temperature adjustment unit, wherein the control unit is configured to:
   acquire a medium reference temperature of the temperature adjustment unit,
   set a difference between the medium reference temperature and a correction value as a set temperature of the temperature adjustment unit, and increase the correction value as the temperature of air taken in increases, and
   decrease the correction value as the temperature of air taken in decreases.

2. The vehicle air conditioning device according to claim 1, wherein the control unit is configured to calculate the correction value based on a difference between the temperature of air taken in and an outside air temperature.

3. The vehicle air conditioning device according to claim 1, wherein the control unit is configured to estimate the temperature of air taken in based on a temperature of an evaporator that the air taken in passes through.

4. The vehicle air conditioning device according to claim 1, wherein the control unit is configured to estimate the temperature of air taken in based on a temperature of air in a vehicle cabin, an outside air temperature, and a ratio between the air in the vehicle cabin and the outside air, in the air taken in.

5. A vehicle air conditioning method for performing air conditioning by controlling a temperature adjustment unit that adjusts a temperature of air taken in, the vehicle air conditioning method comprising:
   acquiring a medium reference temperature of the temperature adjustment unit; and
   setting a difference between the medium reference temperature and a correction value as a set temperature of the temperature adjustment unit, and increasing the correction value as the temperature of air taken in increases.

* * * * *